United States Patent
Sjöborg

(10) Patent No.: US 12,437,421 B2
(45) Date of Patent: Oct. 7, 2025

(54) IMAGE PROCESSING DEVICE AND METHOD OF DETECTING OBJECTS CROSSING A CROSSLINE AND A DIRECTION THE OBJECTS CROSSES THE CROSSLINE

(71) Applicant: Axis AB, Lund (SE)

(72) Inventor: Martin Sjöborg, Lund (SE)

(73) Assignee: AXIS AB, Lund (SE)

( * ) Notice: Subject to any disclaimer, the term of this patent is extended or adjusted under 35 U.S.C. 154(b) by 327 days.

(21) Appl. No.: 18/326,571

(22) Filed: May 31, 2023

(65) Prior Publication Data

US 2023/0419508 A1 Dec. 28, 2023

(30) Foreign Application Priority Data

Jun. 28, 2022 (EP) ..................................... 22181445

(51) Int. Cl.
*G06T 7/246* (2017.01)
*G06T 7/73* (2017.01)

(52) U.S. Cl.
CPC ................ *G06T 7/246* (2017.01); *G06T 7/73* (2017.01); *G06T 2207/10016* (2013.01); *G06T 2207/20081* (2013.01); *G06T 2207/20084* (2013.01); *G06T 2207/20212* (2013.01); *G06T 2207/30196* (2013.01); *G06T 2207/30232* (2013.01)

(58) Field of Classification Search
CPC . G06T 7/246; G06T 7/73; G06T 2207/10016; G06T 2207/20081; G06T 2207/20084; G06T 2207/20212; G06T 2207/30196; G06T 2207/30232; G06N 3/045; G06N 3/09; G06V 10/16; G06V 10/774; G06V 20/52; G06V 20/41; G06V 20/48
See application file for complete search history.

(56) References Cited

U.S. PATENT DOCUMENTS

| | | | | |
|---|---|---|---|---|
| 5,103,433 | A * | 4/1992 | Imhof | G04F 13/02 368/9 |
| 6,545,705 | B1 * | 4/2003 | Sigel | H04N 7/188 348/222.1 |
| 11,288,820 | B2 * | 3/2022 | Boult | G06T 7/215 |
| 2014/0132771 | A1 * | 5/2014 | Gustafsson | G08B 13/19613 348/152 |
| 2016/0110613 | A1 | 4/2016 | Ghanem et al. | |
| 2017/0169560 | A1 * | 6/2017 | Johansson | G06T 7/20 |
| 2018/0096484 | A1 * | 4/2018 | Yasuda | H04N 7/183 |

(Continued)

*Primary Examiner* — Aaron W Carter
(74) *Attorney, Agent, or Firm* — Volpe Koenig

(57) ABSTRACT

A device and method for detecting objects crossing a crossline, and the direction, captured by a video camera are described. A sequence of video image frames of the scene is captured, and a combined image frame is created by extracting two or more lines of pixels of each image frame and arranging them adjacent to each other, wherein the lines of pixels of each video image frame are parallel and correspond to the crossline in the scene. The combined image frame is sent to a machine learning model that detects a combined image frame representing an object crossing a crossline and a direction the object crosses during capturing of the sequence of video image frames. A detection of any object crossing the crossline and a direction of crossing is received from the machine learning model.

15 Claims, 5 Drawing Sheets

(56) References Cited

U.S. PATENT DOCUMENTS

| | | | |
|---|---|---|---|
| 2018/0260632 A1* | 9/2018 | Ebihara | G06V 40/103 |
| 2019/0005336 A1 | 1/2019 | Schulte | |
| 2019/0378283 A1 | 12/2019 | Boult | |
| 2020/0175693 A1* | 6/2020 | Takada | G06V 10/50 |
| 2021/0027067 A1* | 1/2021 | Druihle | G06V 20/63 |
| 2021/0034877 A1* | 2/2021 | Druihle | G06V 40/103 |
| 2021/0133483 A1* | 5/2021 | Prabhu | G06V 10/454 |
| 2021/0334984 A1* | 10/2021 | Gauci | G06T 7/13 |
| 2022/0020159 A1* | 1/2022 | Falk | G06V 20/53 |
| 2022/0375025 A1* | 11/2022 | Ardö | G06V 10/20 |
| 2023/0046840 A1* | 2/2023 | Ramanathan | G06T 7/593 |
| 2023/0419508 A1* | 12/2023 | Sjöborg | G06N 3/09 |
| 2024/0203221 A1* | 6/2024 | Yamada | G08B 13/19652 |

\* cited by examiner

IMAGE PROCESSING DEVICE AND METHOD OF DETECTING OBJECTS CROSSING A CROSSLINE AND A DIRECTION THE OBJECTS CROSSES THE CROSSLINE

TECHNICAL FIELD

The present invention relates to detecting objects crossing a crossline and a direction the objects cross the crossline, and specifically to creating a combined image frame and using a machine learning model to identify crossing and direction of crossing a crossline for objects.

BACKGROUND

In some applications, such as video surveillance applications, it is of interest to identify when objects cross a crossline in a scene captured by a camera in a sequence of video image frames. Hence, prior art solutions have been developed where the objects are detected and tracked in the sequence of video image frames using image processing. When the tracked objects cross a line in the sequence of image frames, which line corresponds to the crossline in the scene, crossings of the crossline by the objects are detected. The number of crossings can be kept track on by means of incrementation of a counter each time an object crosses the crossline is detected. In addition to detecting crossing of the crossline by an object, the direction the object crosses the crossline can also be detected. A problem with such prior art solutions is that object detection and tracking is computationally intensive.

SUMMARY OF THE INVENTION

An object of the present invention is to facilitate a more effective and less computation intensive method for detecting when an object crosses a crossline and which direction the object crosses the crossline.

According to a first aspect, a method of detecting objects crossing a crossline in a scene captured by a video camera and a direction the object crosses the crossline. The method comprises capturing a sequence of video image frames of the scene, and creating a combined image frame by extracting two or more lines of pixels of each image frame of the sequence of video image frames, wherein the two or more lines of pixels of each video image frame are parallel and correspond to the crossline in the scene, and constructing the combined image frame by arranging the extracted two or more lines of pixels of each video image frame of the sequence of video image frames adjacent to each other. The method further comprises sending the combined image frame to a machine learning model trained to detect a combined image frame created from a sequence of video image frames that represents an object crossing a crossline in a scene and a direction the object crosses the crossline during capturing of the sequence of video image frames, and receiving from the machine learning model, a detection of any object crossing the crossline in the scene and a direction the object crosses the crossline during capturing of the sequence of video image frames.

By 'the two or more lines of pixels of each image frame of the sequence of video image frames correspond to the crossline in the scene' is meant that if a representation of an object crosses the two or more lines of pixels in the sequence of video image frames, this corresponds to the object having crossed the crossline in the scene.

By 'crossline' is meant any line in a scene in relation to which one or more crossings by objects and directions of the one or more crossings by the objects are to be detected. The crossline may relate to some feature of the scene such as a doorway or other feature in the scene, but it may as well relate to any line in the scene that does not relate to any specific feature in the scene.

By 'arranging the extracted two or more lines of pixels of each video image frame of the sequence of video image frames adjacent to each other' is meant that the extracted two or more lines of pixels of a second video image frame is arranged adjacent to the extracted two or more lines of pixels of a first video image frame, and then the extracted two or more lines of pixels of a third video image frame is arranged adjacent to the extracted two or more lines of pixels of the second video image frame etc. The lines of pixels are arranged adjacent to each other along their lengths.

The machine learning model may be any kind of machine learning model that can be used for image recognition, for example using supervised learning.

By arranging the extracted two or more lines of pixels from each video image frame of the sequence of video image frames adjacent to each other to create the combined image, wherein the two or more lines of pixels correspond to the crossline in the scene, if an object crosses the crossline in the scene during capturing of the sequence of video image frames, the combined image will be a representation of the object crossing the crossline in the scene. Furthermore, since two or more lines of pixels are extracted from each video image frame, the resulting representation of the object crossing the crossline in the scene will be different depending on which direction the object crosses the crossline in the scene. Hence, a machine learning model can be used for detection of any object crossing the crossline in the scene and a direction the object crosses the crossline during capturing of the sequence of video image frames, wherein the machine learning model is trained to detect a combined image frame created from a sequence of video image frames that represents an object crossing a crossline in a scene and a direction the object crosses the crossline during capturing of the sequence of video image frames.

By enabling use of only the extracted two or more lines of pixels from each video image frame to create the combined image frame, the image processing required to detect objects crossing the crossline and the direction of crossing only uses a portion of all pixels of all frames which reduces the computational load as compared to image processing of the entirety of each video image frame of the sequence of video image frames as in prior art. Furthermore, by enabling use of only pixels corresponding to the crossline, objects that do not cross the crossline in the scene will not be detected and tracked as they would in prior art. This also reduces the computational load as compared to prior art.

Furthermore, by extracting at least two lines of pixels of each video image frame, the contribution from the two lines of pixels of each video image frame to the combined image frame will differ in appearance depending on the direction an object crosses the crossline. By using a machine learning model that has been trained to detect a combined image frame created from a sequence of video image frames that represents an object crossing a crossline and a direction the object crosses the crossline, whether an object crosses a crossline and in which direction it crosses can be detected from the combined image frame.

In the act of constructing the combined image frame, the extracted two or more lines of pixels may be arranged adjacent to each other in the same order as the order in the sequence of video image frames of the image video frames from which the two or more lines of pixels are extracted.

On condition that an object crosses the crossline during capturing the sequence of video frames, the combined image frame comprises a combined object consisting of representations of portions of the object in the extracted two or more lines of pixels of each video image frame, and wherein, in the act of sending the combined image, the combined image is sent to a machine learning model trained to detect a combined object in a combined image frame created from a sequence of video image frames, which combined object represents an object crossing a crossline in a scene and a direction the object crosses the crossline during capturing of the sequence of video image frames.

An object crossing the crossline in the scene will result in a representation of the object also in the combined image frame in the form of the combined object. Specifically, representations of portions of the object in the extracted two or more lines of pixels in each video image frame captured during the time interval when the object crosses the crossline will be included in the combined image frame and forms the combined object. Furthermore, since two or more lines of pixels are extracted from each video image frame, the resulting combined object in the combined image frame will be different depending on which direction the object crosses the crossline in the scene. Hence, a machine learning model can be used for detection of any object crossing the crossline in the scene and a direction the object crosses the crossline during capturing of the sequence of video image frames, wherein the machine learning model is trained to detect a combined object in a combined image frame created from a sequence of video image frames, which combined object represents an object crossing a crossline in a scene and a direction the object crosses the crossline during capturing of the sequence of video image frames.

The longest distance between two lines of the extracted two or more lines may be less or equal to 20 lines, and preferably less or equal to 10 lines.

Furthermore, the extracted two or more lines may be adjacent, i.e. be adjacent to each other in each video image frame.

In embodiments, four or more lines are extracted.

According to a second aspect, a non-transitory computer-readable storage medium is provided having stored thereon instructions for implementing the method according to the first aspect when executed in a device having an image sensor and a processor.

The above-mentioned optional features of the method according to the first aspect, when applicable, apply to the non-transitory computer-readable storage medium according to second aspect as well. To avoid undue repetition, reference is made to the above.

According to a third aspect, an image processing device for detecting objects crossing a crossline in a scene captured by a video camera and a direction the object crosses the crossline is provided. The image processing device comprising an image sensor for capturing a sequence of video image frames of the scene, and circuitry arranged to execute a creating function, a sending function, and a receiving function. The creating function is arranged to create a combined image frame by extracting two or more lines of pixels of each video image frame of the sequence of video image frames, wherein the two or more lines of pixels of each video image frame are parallel and correspond to the crossline in the scene, and constructing the combined image frame by arranging the extracted two or more lines of pixels of the sequence of video image frames adjacent to each other. The sending function is arranged to send the combined image frame to a machine learning model trained to detect a combined image frame created from a sequence of video image frames that represents an object crossing a crossline in a scene and a direction the object crosses the crossline during capturing of the sequence of video image frames. The receiving function is arranged to receive, from the machine learning model, a detection of any object crossing the crossline in the scene and a direction the object crosses the crossline during capturing of the sequence of video image frames.

The above-mentioned optional additional features of the method according to the first aspect, when applicable, apply to the image processing device according to the third aspect as well. To avoid undue repetition, reference is made to the above.

According to a fourth aspect, a method of training a machine learning model to detect that an object crosses a crossline in a scene captured by a video camera and a direction the object crosses the crossline is provided. The method comprises creating a combined image frame for training by extracting two or more lines of pixels of each image frame of a training sequence of video image frames, wherein the two or more lines of pixels of each video image frame are parallel and correspond to the crossline in the training scene, and wherein a known object crosses the crossline in the training scene in a known direction during capturing of the training sequence of video image frames, and constructing the combined image frame for training by arranging the extracted two or more lines of pixels of the sequence of video image frames adjacent to each other. The method further comprises labelling the combined image frame for training with information specifying that the combined image frame for training represents the known object crossing the crossline in the training scene in the known direction during capturing of the training sequence of video image frames, and having the labelled combined image frame for training as input, training the machine learning model to detect a combined image frame created from a sequence of video image frames that represents an object crossing a crossline in a scene and a direction the object crosses the crossline during capturing of the sequence of video image frames.

In the act of constructing the combined image frame for training, the extracted two or more lines of pixels may be arranged adjacent to each other in the same order as the order in the training sequence of video image frames of the image video frames from which the two or more lines of pixels are extracted.

The combined image frame for training may comprise a combined object for training consisting of representations of portions of the known object in the extracted two or more lines of pixels. In the act of labelling the combined image frame for training, the information specifying that combined image frame for training represents the known object crossing the crossline in the training scene in the known direction during capturing of the training sequence of video image frames may then be information specifying that the combined object represents the known object crossing the crossline in the training scene in the known direction during capturing of the training sequence of video image frames. The act of training the machine learning model may then comprise having the labelled training image as input, training the machine learning model to detect a combined object in a combined image frame created from a sequence of video image frames, which combined object represents an object crossing a crossline in a scene and a direction the object crosses the crossline during capturing of the sequence of video image frames.

The above-mentioned further optional features of the method according to the first aspect, when applicable, apply to the method according to the third aspect as well. To avoid undue repetition, reference is made to the above.

It is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described hereinafter with reference to the accompanying drawings, in which currently preferred embodiments of the invention are illustrated. This invention may, however, be embodied in many different forms and should not be construed as limited to the embodiments set forth herein.

The invention is applicable in scenarios in which one or more object crossing a crossline in a scene captured by a camera in a sequence of video image frames and the direction of the crossing is to be detected.

The inventor has recognized that, by extracting at least two lines of pixels of each video image frame, the contribution from the two lines of pixels of each video image frame to the combined image frame will differ in their general appearance depending on the direction an object crosses the crossline, and that this enables the use of and training of a machine learning model to detect from the combined image frame whether an object crosses a crossline and in which direction if the machine learning model has been trained to detect a combined image frame created from a sequence of video image frames that represents an object crossing a crossline and a direction the object crosses the crossline.

In connection with FIGS. 1 and 2A-C, embodiments of a method 100 according to the first aspect for detecting objects crossing a crossline in a scene captured by a video camera and a direction the object crosses the crossline will now be discussed.

The method 100 comprises capturing S110 a sequence of video image frames of the scene. The sequence of video image frames is preferably captured S110 by a camera that is fixed in location and orientation in relation to the crossline close to straight above the crossline at locations on the crossline where the objects typically cross the crossline with a line of sight close to perpendicular to the crossline. Other locations and orientations can be used, such as when the camera is not located straight above the crossline but offset in perpendicular direction from the crossline. However, the same or similar location and orientation of the camera should preferably be used as when training the machine learning model used for detection.

Figure 1:
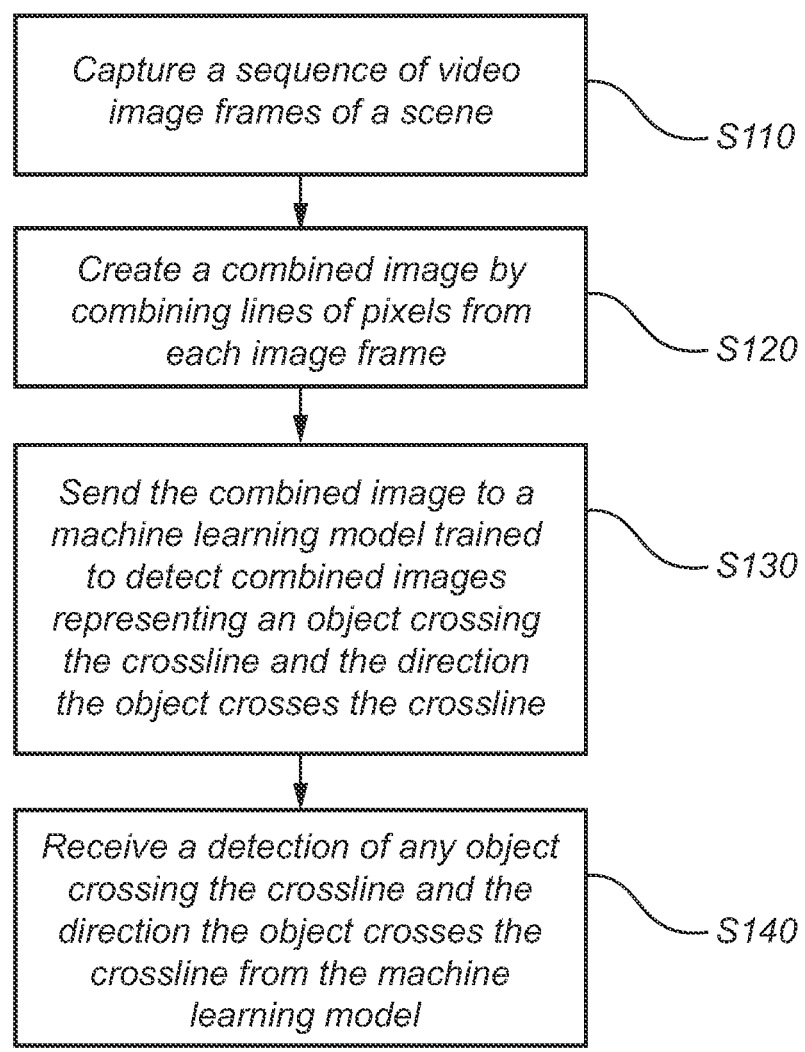
FIG. 1 shows a flow chart in relation to embodiments of a detection method of the present disclosure.
Figure 2A:
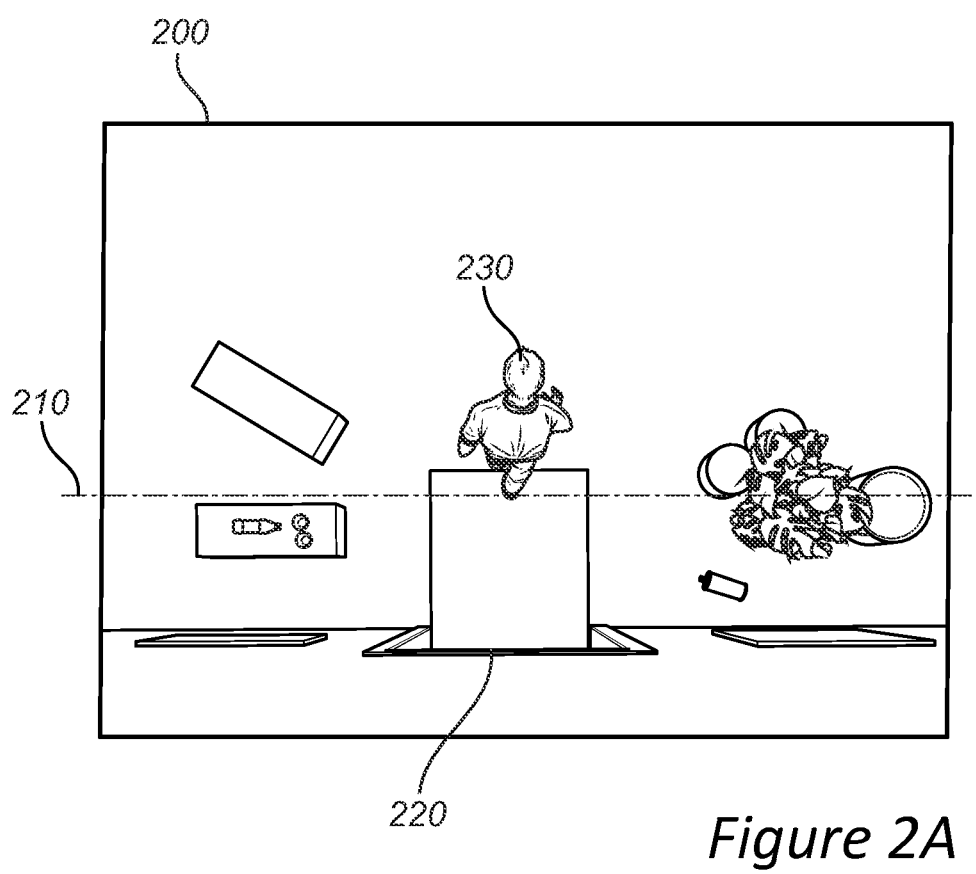
FIGS. 2A-C show illustrations in relation to crossing a crossline and a related combined image frame.

For example, if the crossline is a doorway or a line parallel and close to the doorway and crossing by objects in the form of persons passing the doorway in either direction should be detected, the camera should preferably be located close to the center in horizontal direction of the doorway and close to straight above the crossline. FIG. 2A is an illustration of a scene 200 where a crossline 210 is located at a doorway 220 and a person 230 has just walked through the doorway 220 and crossed the crossline 210. The illustration represents a view of a camera used to capture a sequence of video image frames in the method 100. As can be seen from FIG. 2A, the camera is located above the center in horizontal direction of the doorway 220 and close to straight above the crossline 210.

The method 100 further comprises creating S120 a combined image frame. The combined image frame is created S120 by extracting two or more lines of pixels of each image frame of the sequence of video image frames. The two or more lines of pixels of each video image frame are parallel to and correspond to the crossline in the scene. Each line of pixels is one pixel in width and a number of pixels in length depending on the length of the crossline the two or more lines of pixels should correspond to. Each line of pixels can be a row or a column of pixels in the image frame from which it is extracted but could also have any angle in relation to the rows and columns of pixels of the image frame.

A reason to extracting at least two lines of pixels of each video image frame is that the appearance of the two lines of pixels of a video image frame will differ depending on the direction an object crosses the crossline. For an object having a representation in the video image frames that has a generally convex outer border, if two lines of pixels is extracted from an image frame where the representation of the object has crossed both two lines of pixels, the line of pixels that is later in the direction the object crosses the crossline will have a shorter part including the representation of the object that the other line of pixels in the beginning when the object crosses the two lines of pixels and the line of pixels that is later in the direction the object crosses the crossline will have a longer part including the representation of the object that the other line of pixels in the end of when the object crosses the two lines of pixels. Even if the outer border is not generally convex, details in the border which are convex and/or non-symmetrical in the direction the object crosses the crossline will result in a difference in length for the two lines of pixels when those details cross the crossline. Hence, also in this case the appearance of the two lines of pixels of a video image frame will differ depending on the direction an object crosses the crossline. As an exception, a completely symmetrical object, e.g. a square object crossing the crossline along an axis of symmetry would not result in such a difference in length and hence the appearance of the two lines of pixels of a video image frame would not differ depending on the direction an object crosses the crossline.

The two or more lines of pixels are preferably corresponding two lines of pixels in each of the video image frames, i.e. the correspond to the same two or more lines in the scene for each of the video image frames. However, some variation between video image frames may be used in relation to which two or more lines are extracted. However, the same variation should preferably be used when training the machine learning model.

The distance between two consecutive lines of pixels, i.e. two lines of pixels that do not have any lines of pixels between them, should preferably be less than the size of the representation of the object in a video image frame crossing the crossline. For example, this is preferred when detecting objects crossing a crossline, which objects may move freely in relation to the crossline such that there would then be a risk that a representation of the object in the video image frames crosses one of the two lines of pixels and then moves parallel to the two lines before crossing the other line of pixels or the same one of the two lines of pixels. In cases when the objects are more constrained, such as a car moving along a road, the distance between two consecutive lines of pixels may be longer than the size of the representation of the object in a video image frame crossing the crossline.

Furthermore, the distance between the two or more lines of pixels should preferably be such that most video image frames captured when an object crosses the crossline include representations of portions of the object in all of the two or more lines of pixels. The longest distance may depend on the size of the representation of the type of object for which crossing of the crossline and the direction of the crossing is to be detected. The size of the representation of the type of object will depend on the size of the object and the distance to the object from the camera and the focal length of the camera. The number of lines may be four or more lines. The number of lines of pixels that are extracted may for example depend on the resolution of the video image frames. The higher the resolution, the more lines of pixels are typically extracted. The longest distance between two lines of the extracted two or more lines may for example be less or equal to 20 lines or equal to 10 lines.

Furthermore, the extracted two or more lines may be adjacent, i.e. the extracted two or more lines in each video image frame be adjacent to each other, such that a stripe including two or more adjacent lines of pixels are extracted in each video image frame. Since the appearance of the two or more lines of pixels of a video image frame should differ depending on the direction an object crosses the crossline, having adjacent lines of pixels is more applicable the more lines of pixels that are extracted from each video image frame. If only two lines of pixels are extracted from each video image frame, having a distance between the two lines may be preferred since this will typically cause a larger difference in appearance of the two lines of pixels of a video image frame depending on the direction an object crosses the crossline. The possibility of detecting an object crossing a crossline is for example affected by the size of the object, the distance from the camera to the object when the object crosses the crossline, the focal length of the camera, the sensor size and resolution, the velocity the object crosses the crossline, and the number of frames per second of the sequence of video image frames. Generally, the difference in appearance of extracted adjacent lines of pixels of a video image frame depending on the direction an object crosses the crossline will increase with the number of extracted adjacent lines.

The combined image frame is then constructed by arranging the extracted two or more lines of pixels of each video image frame of the sequence of video image frames adjacent to each other. The combine image frame will then comprise of stripes of pixels arranged adjacent to each other, where each stripe of pixels comprises the two or more lines of pixels from a respective video image frame of the sequence of video image frames. Hence, the combined image frame comprises video image data from video image frames captured at a sequence of (different) points in time.

The extracted two or more lines of pixels may be arranged adjacent to each other in the same order as the order in the sequence of video image frames of the image video frames from which the two or more lines of pixels are extracted. However, some variation in the order of the two or more lines are arranged may be used, i.e. they need not be arranged in exactly the same order as the order in the sequence of video image frames of the image video frames from which the two or more lines of pixels are extracted. However, the same variation should preferably be used when training the machine learning model.

Figure 2B:
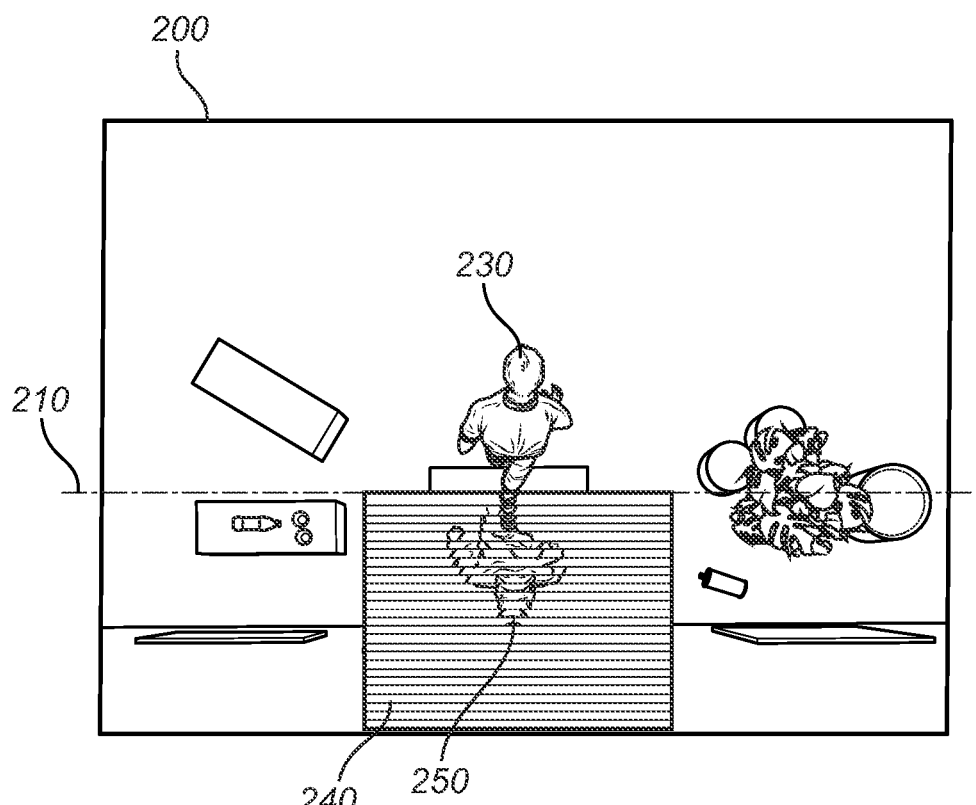

Turning to FIG. 2B, a combined image frame 240 created according to an embodiment of the method 100 is illustrated in relation to the crossline 210 in the scene 200. As the object 230 has crossed the crossline 210 in the scene, a plurality of (nine) adjacent lines of pixels has been extracted from each video image frame of the sequence of video image frames captured by the camera. The contribution to the combined image from each video image frame of the sequence of video image frames is a stripe of pixels comprising the plurality pixels extracted from the respective video image frame. In the combined image frame 240, the extracted plurality of adjacent lines of pixels have been arranged in the same order as the order the video image frames from which they are extracted appear in the video image frames such that a plurality of adjacent lines of pixels extracted from a video image frame is arranged above the plurality of adjacent lines of pixels extracted from a previous video image frame. Hence, the stripe at the bottom of the combined image 240 corresponds to the earliest video image frame in the sequence of video image frames and the stripe at the top of the combined image 240 corresponds to the last video image frame in the sequence of video image frames.

For an object having a representation in the video image frames that has a generally convex outer border, such as a person 230 as seen from above in FIGS. 2A-B, stripes comprising a plurality of adjacent lines of pixels extracted from video image frames when the person crosses the crossline in the direction upwards will first include representations of portions of the person 230 that each is wider at the bottom of the stripe than at the top of the stripe and then later include representations of portions of the person that each is wider at the top of the stripe than at the bottom of the stripe. This can be seen more clearly in FIG. 2C including an enlarged illustration of the combined image 240 including the representations of the portions of the person 230. In the beginning when the front of the head and shoulders of the person 230 cross the crossline 210, the corresponding stripes at the lower part of the enlarged illustration include representations of portions of the person that each is wider at the bottom of the stripe than at the top of the stripe. Then when the back of the persons 230 legs and feet cross the crossline 210, the corresponding stripes at the upper part of the enlarged illustration include representations of portions of the person that each is wider at the top of the stripe than at the bottom of the stripe. If the person 230 instead would have crossed the crossline 210 downwards, the result would have been different. In the beginning when the front of the head and shoulders of the person 230 would have crossed the crossline 210 downwards, the corresponding stripes at the lower part of the enlarged illustration would have included representations of portions of the person that each would have been wider at the top of the stripe than at the bottom of the stripe. Then when the back of the persons 230 legs and feet would have crossed the crossline 210, the corresponding stripes at the upper part of the enlarged illustration would have included representations of portions of the person that each would have been wider at the bottom of the stripe than at the top of the stripe.

Generally, as indicated above, for an object having a representation in the video image frames that has a generally convex outer border and/or if details of the border are convex and/or non-symmetrical in the direction the object crosses the crossline, the respective appearance of each two lines of pixels extracted from each video image frame will depend on the direction an object crosses the crossline. Hence, a combined image frame constructed form such extracted two lines of pixels from each video image frame will differ in appearance depending on the direction the object crosses the crossline. Furthermore, it should be noted that the appearance of the combined image will be different depending on whether the two or more lines of pixels extracted from a video image frame is arranged above or below the two or more lines of pixels extracted from a previous video image frame. Both alternatives are viable. However, the same alternative should preferably be used also for training the machine learning model.

Figure 4:
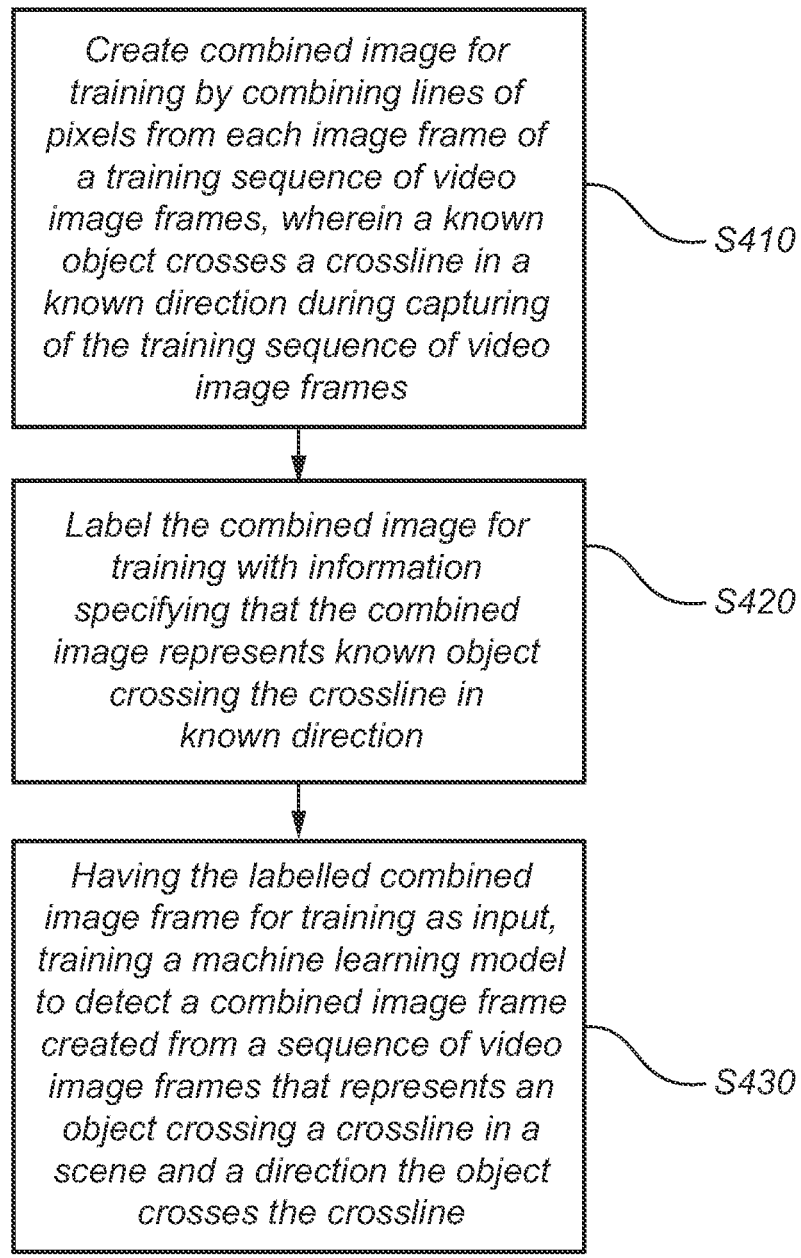
FIG. 4 shows a flow chart in relation to embodiments of a training method of the present disclosure.

The method 100 further comprises sending S130 the combined image frame to a machine learning model trained to detect a combined image frame created from a sequence of video image frames that represents an object crossing a crossline in a scene and a direction the object crosses the crossline during capturing of the sequence of video image frames. An example of a method 400 of training such a machine learning model will be discussed in relation to FIG. 4.

The method 100 finally comprises receiving S140 from the machine learning model, a detection of any object crossing the crossline in the scene and a direction the object crosses the crossline during capturing of the sequence of video image frames.

When an object crosses the crossline in the scene, this will result in a representation of the object also in the combined image frame which may be named a combined object. Specifically, as indicated hereinabove, representations of portions of the object in the extracted two or more lines of pixels in each video image frame captured during the time interval when the object crosses the crossline will be included in the combined image frame and forms the combined object. Furthermore, since two or more lines of pixels are extracted from each video image frame, the resulting combined object in the combined image frame will be different depending on which direction the object crosses the crossline in the scene. Hence, the machine learning model used for detection of crossing and direction of crossing of the crossline can be trained to detect a combined object in a combined image frame created from a sequence of video image frames, which combined object represents an object crossing a crossline in a scene and a direction the object crosses the crossline during capturing of the sequence of video image frames.

Figure 2C:
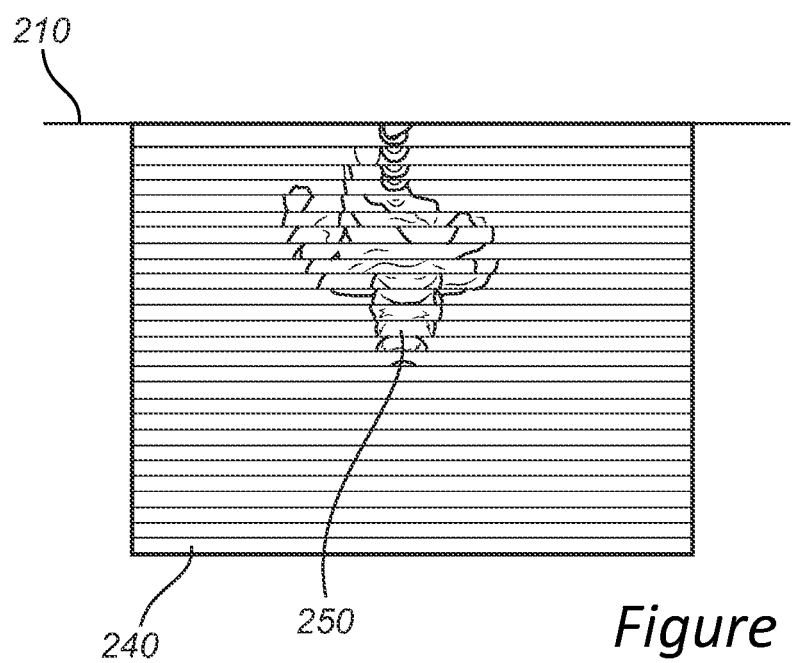

An example of such a combined object is shown in FIGS. 2B-C wherein the stripes comprising a plurality of adjacent lines of pixels extracted from video image frames when the person 230 crosses the crossline 210 in the direction upwards include representations of portions of the person 230 which together form the combined object 250.

The method 100 may be performed for a combined image frame once two or more lines of pixels from each video image frame of the sequence of video image frames have been extracted. The number of video image frames in the sequence of video image frames and the number of lines of pixels extracted from each video image frame determines the size of the combined image frame. The sequence of video image frames is typically a part of a video stream. The method may then be performed again for a new combined image frame. For example, two or more lines of pixels can be extracted from a video image frame subsequent to the sequence of video image frames in the video stream. The two or more lines of pixels may then be arranged adjacent to the latest added two or more lines of pixels in the combined image frame for which the method 100 has been performed and the earliest added two or more lines of pixels in the combined image frame for which the method 100 has been performed may be removed. A new combined image has thus been created and the method 100 may be performed for the new combined image frame. This can then be repeated for each new video image frame in the video stream and crossing of the crossline by objects and the direction of crossing can be counted over time.

By repeating the method 100 for each new video image frame of the video stream, the same crossing of the crossline in the same direction by an object may be detected by the machine learning model many times. Hence, further functionality needs to be included to avoid that the same crossing of the crossline in the same direction by an object is detected and counted more than once. For example, only one detection may be allowed to be counted during a certain time interval. Hence, if a crossing of the crossline in the same direction by an object is detected, no further detections are counted during the time interval. In alternative, or in combination, a combined object may be identified in a combined image frame once detected and new detections close to the combined object is ignored.

Furthermore, it should be noted that an object crossing a crossline may relate to a portion of another object. For example, the object may relate to a head of a person. In such cases, the combined object may relate to the representation in the combined image frame of a head of a person who is crossing a crossline and the machine learning model has been trained to detect such combined objects.

Additionally, a detection of the velocity of objects crossing the crossline may be included in the method 100. Generally, the higher velocity an object crosses the crossline at, the shorter the resulting combined object will be in the direction the object crosses the crossline. For example, if the person 230 in FIGS. 2A and 2B would have crossed the crossline 210 at a higher velocity, the combined object 250 would have been shorter in the direction the person 230 crosses the crossline 210. This is since a representation of a portion of the person 230 will be in the two or more lines of pixels of fewer video image frames if the person 230 would have crossed the crossline at a higher velocity. This may then be combined with the use of a machine learning model trained to detect a combined image frame created from a sequence of video image frames that represents an object crossing a crossline in a scene and a direction the object crosses the crossline at different velocities during capturing of the sequence of video image frames. This works best for objects that are similar in size. For objects that may differ much in length in the direction the object crosses the crossline, such as cars, the detection of the velocity will be less exact since the length of the object itself in the direction the object crosses the crossline also affects the length of the resulting combined object the direction the object crosses the crossline.

Figure 3:
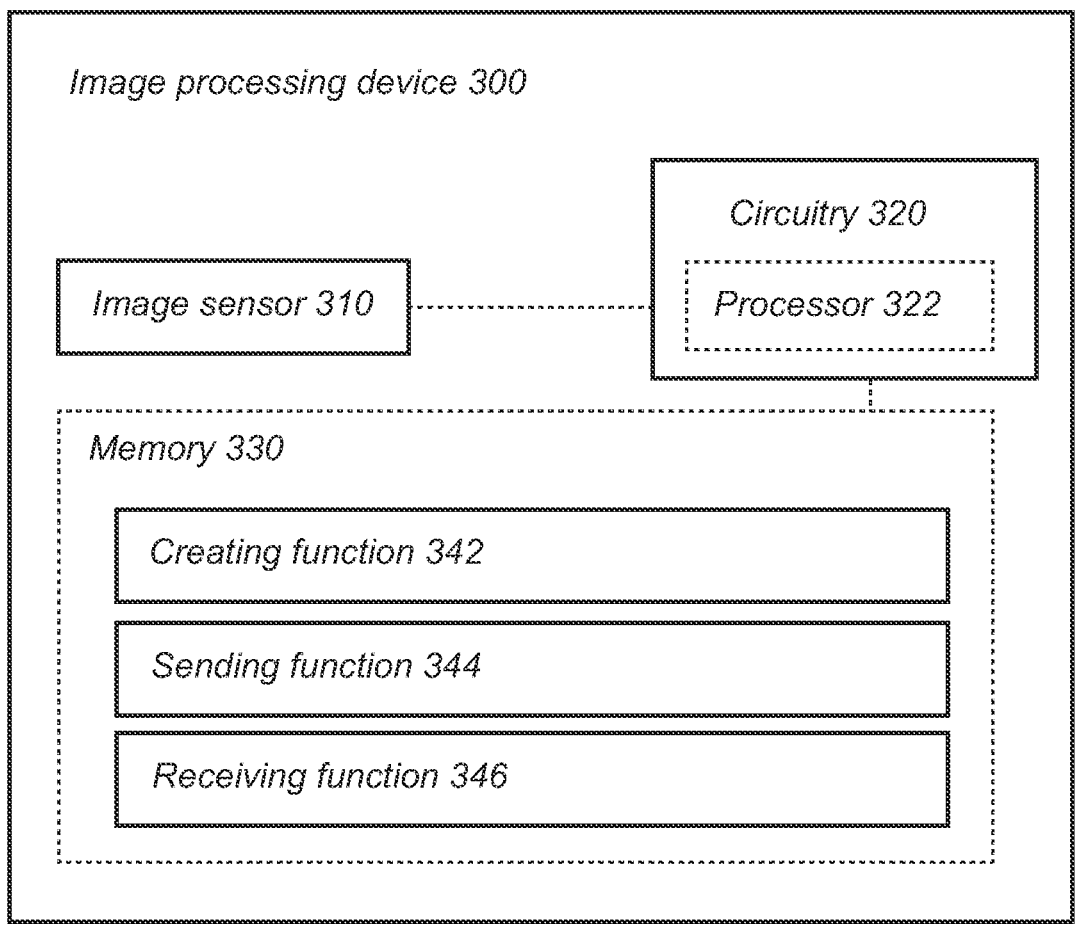
FIG. 3 shows a schematic diagram in relation to embodiments of an image processing device of the present disclosure.

In connection with FIG. 3, embodiments of an image processing device 300 for detecting objects crossing a crossline in a scene captured by a video camera and a direction the object crosses the crossline of the fourth aspect will be discussed. The image processing device may for example be a video camera. The steps of the method 100 may be performed by the image processing device 300 described in connection with FIG. 3.

The image processing device 300 comprises an image sensor 310 and a circuitry 320. The circuitry 320 is configured to carry out functions of the image processing device 300. The circuitry 320 may include a processor 322, such as for example a central processing unit (CPU), graphical processing unit (GPU), tensor processing unit (TPU), microcontroller, or microprocessor. The processor 322 is configured to execute program code. The program code may for example be configured to carry out the functions of the image processing device 300.

The image processing device 300 may further comprise a memory 330. The memory 330 may be one or more of a buffer, a flash memory, a hard drive, a removable media, a volatile memory, a non-volatile memory, a random access memory (RAM), or another suitable device. In a typical arrangement, the memory 330 may include a non-volatile memory for long term data storage and a volatile memory that functions as device memory for the circuitry 320. The memory 330 may exchange data with the circuitry 320 over a data bus. Accompanying control lines and an address bus between the memory 330 and the circuitry 320 also may be present.

Functions of the image processing device 300 may be embodied in the form of executable logic routines (e.g., lines of code, software programs, etc.) that are stored on a non-transitory computer readable medium (e.g., the memory 330) of the image processing device 300 and are executed by the circuitry 320 (e.g., using the processor 322). Furthermore, the functions of the image processing device 300 may be a stand-alone software application or form a part of a software application that carries out additional tasks related to the image processing device 300. The described functions may be considered a method that a processing unit, e.g. the processor 322 of the circuitry 320 is configured to carry out. Also, while the described functions may be implemented in software, such functionality may as well be carried out via dedicated hardware or firmware, or some combination of hardware, firmware and/or software.

The image sensor 310 is configured to capture a sequence of video image frames of the scene.

The circuitry 320 is configured to execute a creating function 342, a sending function 344, and a receiving function 346.

The creating function 342 is arranged to create a combined image frame by extracting two or more lines of pixels of each video image frame of the sequence of video image frames, wherein the two or more lines of pixels of each video image frame are parallel and correspond to the crossline in the scene, and constructing the combined image frame by arranging the extracted two or more lines of pixels of the sequence of video image frames adjacent to each other.

The sending function 344 is arranged to send the combined image frame to a machine learning model trained to detect a combined image frame created from a sequence of video image frames that represents an object crossing a crossline in a scene and a direction the object crosses the crossline during capturing of the sequence of video image frames.

The receiving function 346 is arranged to receive, from the machine learning model, a detection of any object crossing the crossline in the scene and a direction the object crosses the crossline during capturing of the sequence of video image frames.

The functions carried out by the circuitry 320 may be further adapted as the corresponding steps of the embodiments of the method 100 described in relation to FIGS. 1, 2A-C.

In connection with FIGS. 4, and 2A-C, embodiments of a method 400 according to the fourth aspect for training a machine learning model to detect that an object crosses a crossline in a scene captured by a video camera and a direction the object crosses the crossline will now be discussed.

The method 400 comprises creating S410 a combined image frame for training by extracting two or more lines of pixels of each video image frame of a training sequence of video image frames, wherein the two or more lines of pixels of each video image frame are parallel and correspond to the crossline in the training scene, and wherein a known object crosses the crossline in the training scene in a known direction during capturing of the training sequence of video image frames, and constructing the combined image frame for training by arranging the extracted two or more lines of pixels of the sequence of video image frames adjacent to each other.

The training scene used for training the machine learning model may be the same scene as will be used when detecting crossing of a crossline by an object using the machine learning model but could be a different scene as long as the known object is of the same type as the object for which detection of crossing of the crossline should be detected using the machine learning model.

The distance between the two or more lines of pixels, whether or not the two or more lines are adjacent or not, and the way the two or more lines from each video image frame of the training sequence of video image frames may be adapted as in the method 100 described in connection with FIGS. 1 and 2A-C. The adaptation should preferably be the same as will be used for in the method 100 for detecting objects crossing a crossline in a scene captured by a video camera and a direction the object crosses the crossline using the machine learning model trained according to the method 400.

As indicated hereinabove, FIG. 2A is an illustration of a scene 200 where a crossline 210 is located at a doorway 220 and a person 230 has just walked through the doorway 220 and crossed the crossline 210. A sequence of video image frames including video image frames captured when the person 230 crosses the crossline 210 can be used as a training sequence of video image frames. The combined image frame for training 240 would be a combined image frame created according to an embodiment of the method 400. As the object 230 has crossed the crossline 210 in the scene, a plurality of adjacent lines of pixels has been extracted from each video image frame of the sequence of video image frames captured by the camera. The contribution to the combined image frame for training 240 from each video image frame of the training sequence of video image frames is a stripe of pixels comprising the plurality pixels extracted from the respective video image frame.

The method 400 further comprises labelling S420 the combined image frame for training with information specifying that the combined image frame for training represents the known object crossing the crossline in the training scene in the known direction during capturing of the training sequence of video image frames, and having the labelled combined image frame for training as input for training S430.

The method 400 further comprises training S430 the machine learning model to detect a combined image frame created from a sequence of video image frames that represents an object crossing a crossline in a scene and a direction the object crosses the crossline during capturing of the sequence of video image frames.

If the combined image frame 240 of FIG. 2B is used for training, the combined image frame for training 240 may be labeled with information specifying that the combined image frame for training 240 represents the known object in the form of the person 230 crossing the crossline 210 in the training scene in the known direction, namely upwards, during capturing of the training sequence of video image frames.

The combined image frame for training may comprise a combined object for training consisting of representations of portions of the known object in the extracted two or more lines of pixels. In the act of labelling the combined image frame for training, the information specifying that combined image frame for training represents the known object crossing the crossline in the training scene in the known direction during capturing of the training sequence of video image frames may then be information specifying that the combined object for training represents the known object crossing the crossline in the training scene in the known direction during capturing of the training sequence of video image frames. The act of training the machine learning model may then comprise having the labelled training image as input, training the machine learning model to detect a combined object in a combined image frame created from a sequence of video image frames, which combined object represents an object crossing a crossline in a scene and a direction the object crosses the crossline during capturing of the sequence of video image frames.

If the combined image frame 240 of FIG. 2B is used for training, the combined image frame 240 may be labeled with information specifying that the combined object 250 represents the known object in the form of the person 230 crossing the crossline 210 in the training scene in the known direction, namely upwards, during capturing of the training sequence of video image frames. The combined object 250 can be seen more clearly in FIG. 2C including an enlarged illustration of the portion of the combined image 240 including the representations of the portions of the person 230.

The machine learning model may further comprise labelling S420 the combined image frame for training with information specifying that the combined image frame for training represents the known object crossing the crossline in the training scene in the known direction at known velocity during capturing of the training sequence of video image frames, and having the labelled combined image frame for training as input, training the machine learning model to detect a combined image frame created from a sequence of video image frames that represents an object crossing a crossline in a scene, and a direction and a velocity the object crosses the crossline during capturing of the sequence of video image frames.

It is to be noted that the details regarding the two or more lines of pixels, the combined image frame, and the combined object provided in relation to the method 100 are applicable also regarding the two or more lines of pixels, the combined image for training, and combined object for training in relation to the method 400.

The machine learning model may for example be a neural network, such as a convolutional neural network which has been trained to detect that a combined image represents an object crossing a crossline in a scene and a direction the object crosses the crossline during capturing of the sequence of video image frames. Specifically, the neural network may be trained to detect a combined object in a combined image frame created from a sequence of video image frames, which combined object represents an object crossing a crossline in a scene and a direction the object crosses the crossline during capturing of the sequence of video image frames.

An example of a neural network that can be used is a convolutional neural network which is described e.g. in https://en.wikipedia.org/wiki/Convolutional_neural_network. Further description including description on how training may be performed is provided in https://paperswithcode.com/method/efficientnet and https://pytorch.org/blog/torchvision-ssdlite-implementation/. Another example of a neural network that can be used is a recurrent neural network which is described e.g. in https://en.wikipedia.org/wiki/Recurrent_neural_network.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for detecting objects crossing a crossline in a scene captured by a video camera and a direction the object crosses the crossline, the method comprising:
   capturing a sequence of video image frames of the scene;
   creating a combined image frame by:
      extracting two or more lines of pixels of each image frame of the sequence of video image frames, wherein the two or more lines of pixels of each video image frame are parallel to, and correspond to, the crossline in the scene such that if a representation of an object crosses the two or more lines of pixels in the sequence of video image frames, this corresponds to the object having crossed the crossline in the scene, and
      constructing the combined image frame by arranging the extracted two or more lines of pixels of each video image frame of the sequence of video image frames adjacent to each other;
   sending the combined image frame to a machine learning model trained to detect a combined image frame created from a sequence of video image frames that represents an object crossing a crossline in a scene and a direction the object crosses the crossline during capturing of the sequence of video image frames; and
   receiving from the machine learning model, a detection of any object crossing the crossline in the scene and a direction the object crosses the crossline during capturing of the sequence of video image frames.

2. The method of claim 1, wherein, in constructing the combined image frame, the extracted two or more lines of pixels are arranged adjacent to each other in the same order as the order in which the sequence of video image frames from which the two or more lines of pixels are extracted.

3. The method of claim 1, wherein, on condition that an object crosses the crossline, the combined image frame comprises a combined object consisting of representations of portions of the object in the extracted two or more lines of pixels, and wherein, in the act of sending the combined image, the combined image frame is sent to a machine learning model that detects a combined object in a combined image frame, which combined object represents an object crossing a crossline in a scene and a direction the object crosses the crossline during capturing of the sequence of video image frames.

4. The method of claim 1, wherein the machine learning model is a neural network.

5. The method of claim 1, wherein the longest distance between two lines of the extracted two or more lines is less than or equal to 20 lines, and preferably less than or equal to 10 lines.

6. The method of claim 1, wherein the extracted two or more lines are adjacent.

7. The method of claim 1, wherein four or more lines are extracted.

8. A non-transitory computer-readable storage medium having stored thereon instructions for implementing a method when executed in a device having an image sensor and a processor, the method for detecting objects crossing a crossline in a scene captured by a video camera and a direction the object crosses the crossline, the method comprising:
   capturing a sequence of video image frames of the scene;
   creating a combined image frame by:
      extracting two or more lines of pixels of each image frame of the sequence of video image frames, wherein the two or more lines of pixels of each video image frame are parallel to, and correspond to, the crossline in the scene such that if a representation of an object crosses the two or more lines of pixels in the sequence of video image frames, this corresponds to the object having crossed the crossline in the scene, and
      constructing the combined image frame by arranging the extracted two or more lines of pixels of each video image frame of the sequence of video image frames adjacent to each other;
   sending the combined image frame to a machine learning model trained to detect a combined image frame created from a sequence of video image frames that represents an object crossing a crossline in a scene and a direction the object crosses the crossline during capturing of the sequence of video image frames; and
   receiving from the machine learning model, a detection of any object crossing the crossline in the scene and a direction the object crosses the crossline during capturing of the sequence of video image frames.

9. An image processing device for detecting objects crossing a crossline in a scene captured by a video camera and a direction the object crosses the crossline, the image processing device comprising:
   an image sensor for capturing a sequence of video image frames of the scene; and
   circuitry arranged to execute:
      a creating function arranged to create a combined image frame by:
         extracting two or more lines of pixels of each video image frame of the sequence of video image frames, wherein the two or more lines of pixels of each video image frame are parallel to, and correspond to, the crossline in the scene such that if a representation of an object crosses the two or more lines of pixels in the sequence of video image frames, this corresponds to the object having crossed the crossline in the scene, and
         constructing the combined image frame by arranging the extracted two or more lines of pixels of the sequence of video image frames adjacent to each other;
      a sending function arranged to send the combined image frame to a machine learning model trained to detect a combined image frame created from a sequence of video image frames that represents an object crossing a crossline in a scene and a direction the object crosses the crossline during capturing of the sequence of video image frames; and
      a receiving function arranged to receive, from the machine learning model, a detection of any object crossing the crossline in the scene and a direction the object crosses the crossline during capturing of the sequence of video image frames.

10. The image processing device of claim 9, wherein, in the creating function, the extracted two or more lines of pixels are arranged adjacent to each other in the same order as the order in the sequence of video image frames of the image video frames from which the two or more lines of pixels are extracted.

11. The image processing device of claim 9, wherein, on condition that an object crosses the crossline, the combined image frame comprises a combined object consisting of representations of portions of an object in the extracted two or more lines, and wherein, in the sending function, the combined image frame is sent to a machine learning model that detects a combined object in a combined image frame, which combined object represents an object crossing a crossline in a scene and a direction the object crosses the crossline during capturing of the sequence of video image frames.

12. The image processing device of claim 9, wherein the machine learning model is a neural network.

13. A method of training a machine learning model to detect that an object crosses a crossline in a scene captured by a video camera and a direction the object crosses the crossline, the method comprising:
   creating a combined image frame for training by:
      extracting two or more lines of pixels of each image frame of a training sequence of video image frames, wherein the two or more lines of pixels of each video image frame are parallel to, and correspond to, the crossline in the training scene, such that if a representation of an object crosses the two or more lines of pixels in the training sequence of video image frames, this corresponds to the object having crossed the crossline in the training scene, and wherein a known object crosses the crossline in the training scene in a known direction during capturing of the training sequence of video image frames, and
      constructing the combined image frame for training by arranging the extracted two or more lines of pixels of each video image frame of the sequence of video image frames adjacent to each other;
   labelling the combined image frame for training with information specifying that the combined image frame for training represents the known object crossing the crossline in the training scene in the known direction during capturing of the training sequence of video image frames; and having the labelled combined image frame for training as input, training the machine learning model to detect a combined image frame created from a sequence of video image frames that represents an object crossing a crossline in a scene and a direction the object crosses the crossline during capturing of the sequence of video image frames.

14. The method of claim 13, wherein, in constructing the combined image frame for training, the extracted two or more lines of pixels are arranged adjacent to each other in the same order as the order in which the training sequence of video image frames from which the two or more lines of pixels are extracted.

15. The method of claim 13, wherein the combined image frame for training comprises a combined object for training consisting of representations of portions of the known object in the extracted two or more lines of pixels, wherein, in the act of labelling the combined image frame for training, the information specifying that combined image frame for training represents the known object crossing the crossline in the training scene in the known direction during capturing of the training sequence of video image frames specifies that the combined object for training represents the known object crossing the crossline in the training scene in the known direction during capturing of the training sequence of video image frames, and wherein the act of training the machine learning model comprises:

having the labelled training image as input, training the machine learning model to detect a combined object in a combined image frame created from a sequence of video image frames, which combined object represents an object crossing a crossline in a scene and a direction the object crosses the crossline during capturing of the sequence of video image frames.

\* \* \* \* \*